US008112446B2

(12) United States Patent
Carman (10) Patent No.: US 8,112,446 B2
(45) Date of Patent: Feb. 7, 2012

(54) CENTRALIZED CONTENT REPOSITORIES FOR DISTRIBUTED LEARNING MANAGEMENT SYSTEMS

(75) Inventor: Jared M. Carman, Highland, UT (US)

(73) Assignee: Agilant Learning Services LLC, Salt Lake City, UT (US)

( * ) Notice: Subject to any disclaimer, the term of this patent is extended or adjusted under 35 U.S.C. 154(b) by 916 days.

(21) Appl. No.: 11/967,077

(22) Filed: Dec. 29, 2007

(65) Prior Publication Data

US 2008/0301150 A1 Dec. 4, 2008

Related U.S. Application Data

(60) Provisional application No. 60/882,916, filed on Dec. 30, 2006.

(51) Int. Cl.
*G06F 17/30* (2006.01)
(52) U.S. Cl. ........................................ 707/791; 707/802
(58) Field of Classification Search .................. 707/791, 707/802, 999.104
See application file for complete search history.

(56) References Cited

U.S. PATENT DOCUMENTS

| | | | |
|---|---|---|---|
| 5,259,766 A | 11/1993 | Sack et al. | |
| 6,014,134 A | 1/2000 | Bell et al. | |
| 6,118,973 A | 9/2000 | Ho et al. | |
| 6,418,298 B1 | 7/2002 | Sonnenfeld | |
| 6,643,652 B2 | 11/2003 | Helgeson et al. | |
| 6,721,747 B2 | 4/2004 | Lipkin | |
| 6,755,659 B2 | 6/2004 | LoSasso et al. | |
| 6,773,266 B1 | 8/2004 | Dornbush et al. | |
| 6,807,535 B2 | 10/2004 | Goodkovsky | |
| 6,827,578 B2 | 12/2004 | Krebs et al. | |
| 6,839,718 B2 | 1/2005 | Heddings et al. | |
| 6,850,893 B2 | 2/2005 | Lipkin et al. | |
| 6,884,074 B2 | 4/2005 | Theilmann | |
| 6,925,601 B2 | 8/2005 | Moore et al. | |
| 6,975,833 B2 | 12/2005 | Theilmann et al. | |
| 6,978,115 B2 | 12/2005 | Whtiehurst et al. | |
| 6,993,665 B2 | 1/2006 | Heddings et al. | |
| 7,003,576 B2 | 2/2006 | Bjornestead et al. | |
| 7,014,467 B2 | 3/2006 | Krebs et al. | |
| 7,029,280 B2 | 4/2006 | Krebs et al. | |
| 7,072,934 B2 | 7/2006 | Helgeson et al. | |
| 7,089,583 B2 | 8/2006 | Mehra et al. | |
| 7,114,125 B2 | 9/2006 | Schoettger et al. | |
| 7,153,137 B2 | 12/2006 | Altenhofen et al. | |
| 7,237,189 B2 | 6/2007 | Altenhofen et al. | |
| 7,257,557 B2 | 8/2007 | Hullick | |
| 7,260,355 B2 | 8/2007 | L'Allier et al. | |
| 7,272,615 B2 | 9/2007 | Li et al. | |
| 2002/0036694 A1* | 3/2002 | Merril | 348/220 |
| 2003/0028498 A1* | 2/2003 | Hayes-Roth | 706/17 |
| 2003/0208476 A1* | 11/2003 | Heddings et al. | 707/3 |
| 2004/0139111 A1* | 7/2004 | Schoettger et al. | 707/104.1 |
| 2004/0148313 A1* | 7/2004 | Lu et al. | 707/104.1 |
| 2004/0215658 A1* | 10/2004 | Carnegie et al. | 707/104.1 |
| 2004/0243559 A1* | 12/2004 | Brundege | 707/3 |
| 2005/0102322 A1* | 5/2005 | Bagley et al. | 707/104.1 |
| 2005/0131970 A1* | 6/2005 | Salazar et al. | 707/205 |
| 2005/0132020 A1* | 6/2005 | Gorbet et al. | 709/217 |

(Continued)

*Primary Examiner* — Eliyah S Harper
(74) *Attorney, Agent, or Firm* — Snell & Wilmer L.L.P.

(57) ABSTRACT

A learning system, including a centralized reusable learning object (RLO) repository that provides content to users, and communicates user performance data, via SCORM, to and from any one or more distributed, remote SCORM conformant learning management systems. The learning management system may include one or more pointer SCO's, which may point to a content delivery engine in the RLO repository.

9 Claims, 5 Drawing Sheets

U.S. PATENT DOCUMENTS

| | | | |
|---|---|---|---|
| 2005/0203931 A1* | 9/2005 | Pingree et al. | 707/100 |
| 2006/0010096 A1* | 1/2006 | Crossland et al. | 707/1 |
| 2006/0047672 A1* | 3/2006 | Habon et al. | 707/100 |
| 2006/0156223 A1* | 7/2006 | Theilmann | 715/513 |
| 2007/0100882 A1* | 5/2007 | Hochwarth et al. | 707/104.1 |
| 2007/0101331 A1* | 5/2007 | Krebs | 718/101 |
| 2007/0143275 A1* | 6/2007 | Bagley et al. | 707/4 |
| 2007/0162465 A1* | 7/2007 | Cope | 707/100 |
| 2007/0209004 A1* | 9/2007 | Layard | 715/731 |
| 2007/0224585 A1* | 9/2007 | Gerteis et al. | 434/350 |
| 2009/0287738 A1* | 11/2009 | Colbran | 707/104.1 |

* cited by examiner

PRIOR ART    NON-PRIOR ART

CENTRALIZED CONTENT REPOSITORIES FOR DISTRIBUTED LEARNING MANAGEMENT SYSTEMS

RELATED APPLICATION

This application claims priority to, and the benefit of, U.S. Provisional Application Ser. No. 60/882,916, entitled "CENTRALIZED CONTENT REPOSITORIES FOR DISTRIBUTED LEARNING MANAGEMENT SYSTEMS" and filed on Dec. 30, 2006, which application is incorporated herein by reference in its entirety.

FIELD

This disclosure relates to the managed access to information over data networks such as the Internet or local area, wide area, or other networks. The disclosure is of particular interest in the field of learning management systems in which users are provided with access to educational content. However, the disclosure is also relevant to managing access of users to other types of information such as technical, financial, or other data.

BACKGROUND

Education has been a key process in the maintenance and development of every civilized society. Recently, the development of methods and technology for remote education has become increasingly important. Distance learning using communication by mail has been one method of education which is of particular interest to those who are employed and do not have time for a full-time education at a college. Broadcasting educational material by radio or television at a predetermined time is another remote educational method. Yet another remote education method uses video media. It is also known to have a video conferencing system, in which a teacher and a student view each other via a video link. In one system, educational material is distributed through a general network. In this network, a dedicated videophone system and a whiteboard system, which can share data via computers, are linked via a local area network (LAN) or a wide area network (WAN).

The above-described conventional remote education methods generally cause users to be restricted by time, location, media type, and/or communication. It can be difficult to increase the number of users and prepare a variety of flexible educational contents.

With the increasing use of the Internet, remote learning systems have been developed which enable people to access educational courses from anywhere in the world, at any time, by using, e.g., a browser such as Microsoft Internet Explorer™, Opera™, FireFox™, or other similar software systems. An educational establishment hosts a site with one or more educational courses, and users who are registered may log on to the site and access the appropriate course. This type of system is often referred to as "e-Learning". In the last few years, computer systems that enable the delivery, management, and administration of enterprise-wide learning, known as Learning Management Systems (LMS) have become increasingly popular. Learning Management Systems are suites of tools that deliver the proper course or content to the students, at the proper time, in the proper format. An LMS typically provides registration capabilities for all types of learning events, student home pages, automated course catalogues, classroom resource management, skills management, records and content keeping, and delivery of e-Learning courses. Marc J. Rosenberg describes a detailed definition in prior art of the core capabilities of an LMS, in E-Learning: Strategies for Delivering Knowledge in the Digital Age, McGraw-Hill Books, 2001 pp 162. First, by this definition, the LMS may have a common online course catalogue, a common online registration system and an up-front competency assessment tool. The LMS may have the ability to launch and track e-Learning and perform e-Learning assessments and perform management of learning materials. After integrating knowledge management resources, the LMS may perform customized reporting, support collaboration and knowledge communities, and integrate the information into the respective system, e.g., a human resources system used in the management of an organization.

In one learning system, the educational content is provided by a content developer and integrated into an LMS. For example, the information may be supplied by the content provider on one or more CD's or other media, and copied into the LMS system. A student interfaces with the LMS and the content is provided to the student by the LMS. This imposes limitations. The computing and network demands on the system will limit the number of users and the number of courses that can be accessed. There will also be problems if the content varies frequently, and this will be a particular problem if this type of system is used not only for education but also for accessing financial data or constantly changing databases of information.

The communication between content files from content developers and an LMS is increasingly governed by what is known as the Shareable Content Object Reference Model (SCORM). SCORM is essentially a specification or standard to allow LMS programmers and content developers to produce interoperable learning systems without significant collaboration. A content developer whose content files are SCORM conformant can be reasonably confident that the content files will perform as desired with a SCORM conformant LMS.

However, conventional systems require that the LMS and the SCORM conformant educational content be stored on the same Web domain, on the same server, and/or behind the same firewall. In other words, a user accessing a learning management engine at a given Web domain (i.e., within the same root Web address) could only utilize SCORM content that was also stored at the same Web domain (i.e., within the same root Web address). If a content developer were to improve or update the SCORM conformant content to be delivered to the learner, the SCORM conformant content package would have to be delivered to multiple servers to be saved or loaded into the same Web domains as the various learning management engines with which the prior content was associated. For example, a content developer that provided SCORM conformant content packages to two or more universities would have to distribute copies of the updated content package to each of the two or more universities and ensure that the new content package is stored in the proper location.

Other learning systems have a central LMS and external content from a variety of external sources. However, in such systems, the central LMS is a specific, proprietary LMS with its own application programmer's interface (API), business logic, and protocol adapters. This imposes tremendous expense and limitations because institutions who have already purchased an LMS, would be required to then purchase another LMS and migrate their student data to the new LMS. Such migration would cause unnecessary and burdensome cost and risks compromising data during the migration.

There is a need, as identified by the inventor, to enable one or more of any, separate, existing, and SCORM conformant LMS system or systems to connect to a central content repository.

SUMMARY

The systems and methods of the present disclosure have been developed in response to the present state of the art, and in particular, in response to the problems and needs in the art that have not been fully solved by currently available learning systems. Accordingly, the present disclosure provides learning systems and methods, including a centralized reusable learning object (RLO) repository that provides content to users, and communicates user performance data, via SCORM, to and from any one or more distributed, remote SCORM conformant learning management systems. Such systems and methods provide multiple benefits, including, for example, benefits to institutions that have already installed SCORM conformant learning management systems and to content providers who need to deliver content without distributing multiple copies of the content.

These and other features and advantages of the present description will become more fully apparent from the following description or may be learned by the practice of the invention as set forth hereinafter.

BRIEF DESCRIPTION OF THE SEVERAL VIEWS OF THE DRAWINGS

In order that the manner in which the above-recited and other features and advantages of the present disclosure are obtained will be readily understood, a more particular description of the present systems and methods briefly described above will be rendered by reference to specific embodiments thereof which are illustrated in the appended drawings. Understanding that these drawings depict only typical embodiments of the systems and methods and are not therefore to be considered to be limiting of its scope, the present technology will be described and explained with additional specificity and detail through the use of the accompanying drawings in which.

DETAILED DESCRIPTION

Figure 2:
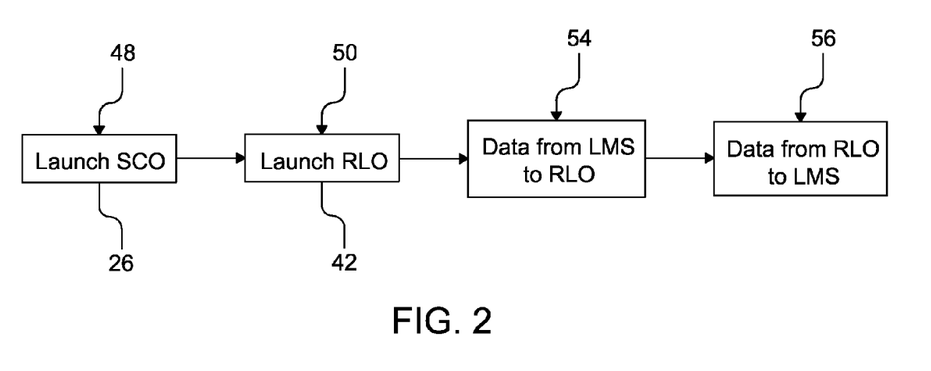
FIG. 2 is a high level schematic flow chart of the relationship between learning management systems and reusable learning objects according to the present disclosure.
Figure 3:
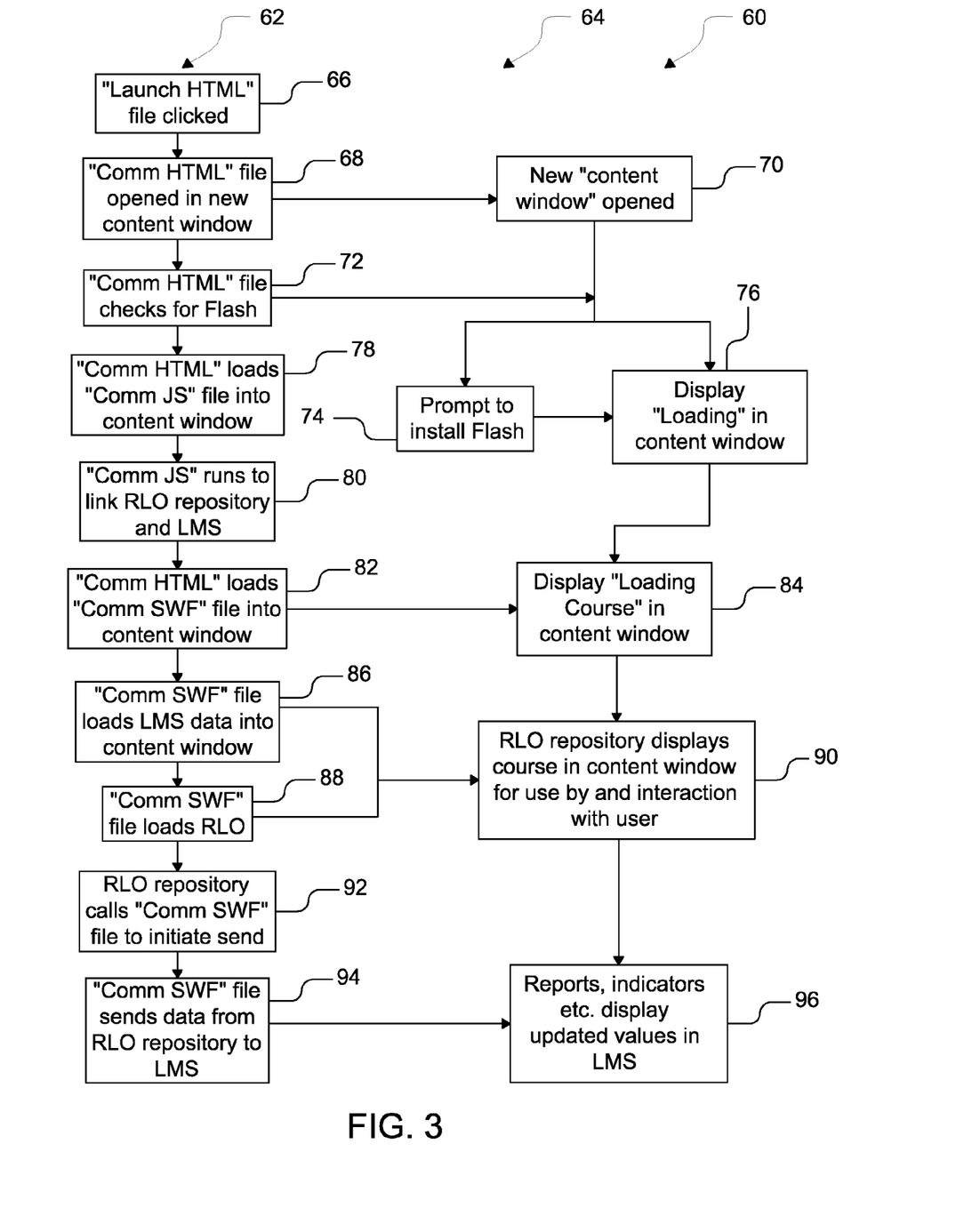
FIG. 3 is an example of a flow chart of the relationship between the learning management systems and the reusable learning objects of the present disclosure.

The presently preferred embodiments will be best understood by reference to the drawings. It will be readily understood that the components, as generally described and illustrated in the figures herein, could be arranged and designed in a wide variety of different configurations. Thus, the following more detailed description of learning systems, as represented in FIGS. 1 through 3, is not intended to limit the scope of the present disclosure, but is merely representative of presently preferred embodiments.

Figure 1:
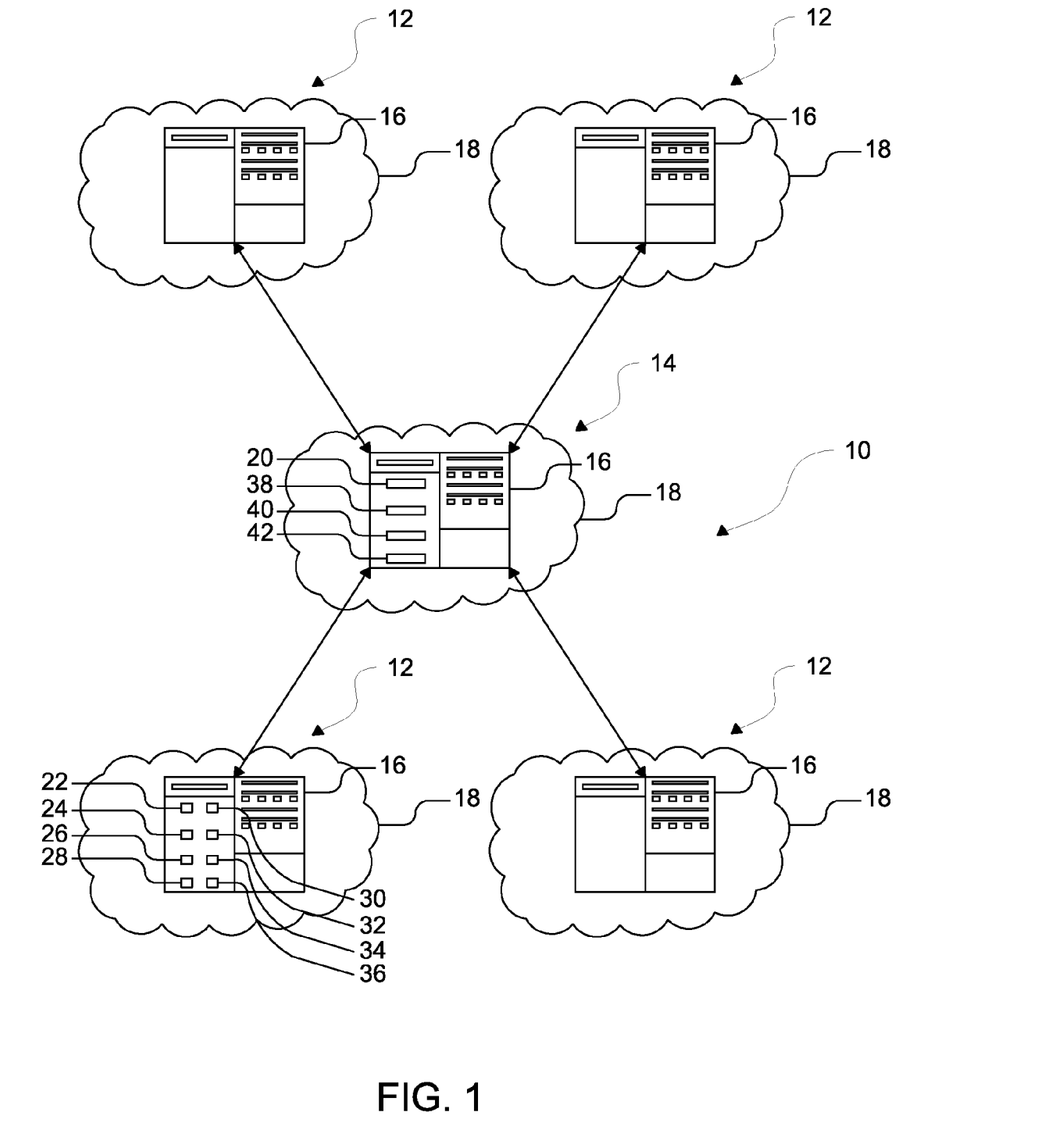
FIG. 1 is schematic representation of learning systems within the scope of the present disclosure.

FIG. 1 illustrates a learning system 10 comprising multiple learning management systems 12 and a centralized, reusable learning object repository 14. Learning systems within the scope of the present disclosure may include a single learning management system 12 or multiple learning management systems as illustrated. As illustrated in FIG. 1, the learning management systems 12 and the reusable learning object (RLO) repository 14 may be hosted on one or more servers 16, on separate Web domains 18, and/or behind separate firewalls. The learning management systems 12 are illustrated as each being hosted on separate servers on separate Web domains 18. However, some implementations may include multiple learning management systems 12 hosted by a common server but in separate Web domains and/or behind separate firewalls.

As compared to conventional learning systems in which the educational material content was required to be hosted on the same servers and within the same Web domain as the learning management engines, FIG. 1 illustrates that the learning systems 10 of the present disclosure enable the SCORM conformant educational material content 20 to be hosted by the RLO repository 14 on a Web domain that is separate from and remote from the learning management systems 12. Accordingly, the present learning systems 10 enable a one-to-many relationship between the RLO repository 14, including the content 20, and the learning management systems 12.

The one-to-many relationship shown in FIG. 1 provides several improvements over the conventional learning systems in which the SCORM conformant educational content 20 was required to be located within the same domain as the learning management systems 12. For example, it is common for the content developers to update the content or to modify the manner in which the content is displayed for the user. In conventional learning systems, such content developers were required to load updated SCORM conformant content packages on each of the servers hosting separate learning management systems. If a content developer desired to serve a large customer base, such an update routine significantly impedes the developers' and users' efforts to provide current content to the learners. Additionally, separating the content 20 from the learning management systems 12 furthers the goals of the SCORM in that it further enables the content developers to focus on content generation and the learning management system developers to focus on the learning management system. Still additionally, by allowing the SCORM conformant content 20 to be hosted on a single server and accessed by multiple learning management systems, the content developers are better able to protect the SCORM conformant content 20 from unauthorized distribution, such as may have occurred when copies of the SCORM conformant content 20 was distributed to multiple administrators for installation on the multiple servers. Further, the systems and methods represented by system 10 of FIG. 1 provide multiple benefits over other conventional learning systems, including, for example, benefits to institutions that have already installed SCORM conformant learning management systems and to content providers who need to deliver content without distributing multiple copies of the content.

With continuing reference to FIG. 1 and particular reference to the exemplary learning management system 12 of the bottom left of the figure, the learning management systems 12 of the present disclosure may be substantially similar to conventional learning management systems in that the learning management systems may include a learning management engine 22 and associated database(s) 24 for hosting shareable content objects (SCO's) 26. However, rather than hosting content-rich SCO's as in conventional learning management systems, the present learning management systems 12 host one or more pointer SCO's 28. In summary, the pointer SCO's 28 are adapted to point the learning management engine to the RLO repository 14 from which the content 20 is displayed for the users' interaction, while preserving the ability to pass student data via SCORM between the RLO repository and the learning management engine.

FIG. 2 illustrates with a high-level schematic flow chart the relationship between the learning management systems 12 and the RLO repository 14 of the present disclosure. As illustrated, the user of the learning management system 12 may launch, at 48, a SCO 26 that in turn launches, at 50, an RLO 42, which may contain at least the educational content 20 from the RLO repository by clicking a link or otherwise performing an action associated with one of the pointer SCO's 28. The pointer SCO 28 and one or more files at the RLO repository 14 then cooperate to pass data from the learning management system 12 to the RLO repository 14 for incorporation into the exercises and educational content during the user's exercise or learning session, as illustrated at 54. During the course of the learning session and/or at the end of thereof, the pointer SCO 28 and the one or more files at the RLO repository 14 again cooperate to pass data from the RLO repository 14 and the learning session associated therewith to the learning management system 12, as illustrated at 56.

The communication between the learning management system 12 and pointer SCO 28 on one domain and the RLO repository 14 on a different domain may be accomplished because of the content of the pointer SCO 28 and the files stored on the RLO repository 14. Considering first the pointer SCO 28, the pointer SCO 28 may, for example, include at least four files: a SCORM manifest file 30, a launch file such as a "launch html" file 32, a first communication or comm file such as a "comm html" file 34, and a second comm file such as a "comm swf" file 36. The launch html file 32, the comm html file 34, and the comm swf file 36 may be files of the format indicated (i.e., html files and swf files) or may be in other suitable formats to accomplish the purposes and functions described herein. The SCORM manifest file 30 may be akin to the conventional content package manifest files of conventional SCO's, however, the SCORM manifest file 30 identifies the launch html file 32 rather than the various content files of conventional manifests. Accordingly, the SCORM manifest files 30 may be an XML file (or other suitable, SCORM conformant format) that identifies the launch html file(s) 32 of the pointer SCO 28.

The launch html file 32 may be adapted to perform one or more system checks upon being opened or selected by the user, such as to confirm that the user's computer has the latest necessary software installed (e.g., the necessary version of the Flash software associated with the user's browser) and to load the comm html file 34 into the user's browser. The comm html file 34 may be adapted to load the comm swf file 36 into the user's browser and to load one or more files from the RLO repository 14 into the user's browser. The comm swf file 36 may be adapted to load a content delivery engine from the RLO repository 14 into the user's browser and to enable communication between the content delivery engine on the RLO repository's Web domain and the learning management system's Web domain.

The RLO repository 14 and the files and programs stored thereon may interact with and communicate with the learning management systems 12 and the pointer SCO's 28. The RLO repository 14 may include or host at least a content delivery engine 38, a comm file such as a js file 40, and one or more content files. The content files, such as XML files and reusable media files may also be referred to as reusable learning objects (RLO's) 42. Each of these engines and files will be discussed in more detail below. The content delivery engine 38 may be adapted to communicate with the learning management system 12 via a combination of one or more of the comm js file 40 and the comm swf file 36. Additionally, the content delivery engine 38 when loaded into the user's browser may be adapted to display and/or stream SCORM conformant educational content from the RLO's 42 stored on the content repository or from content stored elsewhere on the Internet.

In some implementations of present learning systems 10, the SCORM code contained in the comm js file 40 may be hosted on the learning management system 12. Alternatively, the SCORM code enabling the communication between the content delivery engine 38 and the learning management system may be incorporated into the comm js file 40, which may be a javascript file as suggested by its name. While javascript is currently a SCORM conformant language for such communication files and protocols, other languages and file formats may be used according to present or future iterations of SCORM. Additionally, the javascript file of the comm js file 40 includes additional functions and/or instructions for facilitating communication between the RLO repository and the learning management system on separate domains.

Hosting the comm js file 38 on the RLO repository 14 may provide the benefit of allowing the administrators to update and/or modify the communication protocols between the content delivery engine 38 and the learning management system 12 without requiring the user to update every instance of a learning management system at various servers. Accordingly, content developers may modify the content delivery engine 38 and/or the RLO's 42 as necessary over time without concern for the increased burden of updating the communication protocols defined in the comm js files on the various learning management systems.

The content delivery engine 38 may be adapted to deliver SCORM conformant content to the user's browser from the RLO repository or other content from other locations on the Internet. In some implementations, the content delivery engine 38 may be adapted to deliver such content in a format similar to the conventional learning management systems that required the content to be co-located with the learning management systems. Accordingly, users and administrators may interact with a learning system according to the present disclosure (i.e., using a remote RLO repository) without noticing that it is any different from conventional learning systems with co-located SCORM conformant content. Accordingly, the content delivery engine 38 may be adapted to dynamically deliver the content quickly so as to minimize the appearance to the user that the content and the learning management system are not co-located.

Additionally the content delivery engine 38 may be adapted to provide various user interface features to facilitate the user's interaction with the content delivery engine and the content delivered thereby, one or more of which may be incorporated into the content delivery engine. For example, the content delivery engine 38 may be adapted to deliver to the user's browser a user interface screen having a title bar, a breadcrumb-style location trail indicator, and a content delivery area. Additionally, the content delivery engine 38 may provide the user with next/back buttons, media control features when the delivered content includes media files, and a course map, which may be in a nested format to allow the user to easily navigate through the content delivered by the content delivery engine 38. Still additionally, the content delivery engine 38 may provide progress indicators associated with the course map to illustrate to the user which learning objects (e.g., RLO's 42) have been viewed, completed, or remain to be viewed or completed by the user. Other features that may be provided to the user by the content delivery engine 38 may include a search feature for searching for text or pages within learning objects delivered by the content delivery engine and/or a bookmark feature for allowing the user to save and return to a particular location in a learning object. In some implementations of the bookmark feature within a content delivery engine 38, the content delivery engine may be adapted to pass the bookmark information to a SCORM conformant learning management system, such as by interfacing with the comm js file 40 and/or the comm swf file 36.

Other features may be provided by the content delivery engine 38 to facilitate and/or enrich the user's learning experience. As one additional exemplary feature, the user may be able to select an auto-play feature adapted to take the user through a linear presentation of the materials in the learning object without requiring the user to click next, back, or other navigation buttons. One or more of the features of the content delivery engine 38, whether described above or otherwise, may be affected by the nature of the learning object being delivered by the content delivery engine. For example, the learning object may include streaming video, in which case the text search feature may be disabled or temporarily deactivated.

In some implementations of the RLO repository 14, the content delivery engine 38 may be adapted to allow the educators and institutions providing education via the learning systems of the present disclosure to customize the learning experience for their students or for particular classes without modifying the underlying content files or RLO's 42. For example, the content delivery engine 38 may be adapted to communicate with the learning management system to determine which content files should be delivered in what order for particular exercises or lessons. Additionally or alternatively, the pointer SCO 28 of the learning management system 12 may be adapted to call the content delivery engine with instructions regarding the content and structure of the RLO to be delivered to the user, such as having such instructions incorporated into the comm swf file 36. In such implementations, the individual content files that might make up a lesson or exercise may be stored separately in the content repository and collected by the content delivery engine 38 for delivery according to the instructions received from the learning management system. Accordingly, the content files 42 may be easily updated individually and the educators and administrators may have virtually unlimited ability to create the desired educational structure from the SCORM conformant content available on the RLO repository 14.

The RLO repository 14 may also be configured to receive, store, process, and/or transfer various types of data related to a user or user experience to any other element within or portion of the learning system 10, or to elements outside the learning system 10. Specifically, and by way of example, the RLO repository 14 may track user performance and/or report user behavior. Various user behaviors or data relating thereto may include a user's session information, history, performance, progress, efficiency, effectiveness, personal data, course data, academic data, time spent, standard reached, completion data, most recently viewed content, and completion percentage.

In order to better illustrate the interactions between the learning management systems 12 and the RLO repository 14, and the various hardware and software associated with each, an exemplary learning system use case 60 is schematically presented in FIG. 3. The learning system use case 60 shown in FIG. 3 illustrates the background events in the left column 62 and the events that user experiences in the right column 64. The background events that lead to the user events are connected to the same to illustrate the relationships therebetweeen.

The exemplary use case 60 of FIG. 3 begins with the assumption that the user has previously logged in to a SCORM conformant learning management system 12 and that the SCORM manifest file 30 has presented the user with one or more links representing the launch html file(s) 32 of the pointer SCOs 28 described above. The user clicks one of the links at 66 opening the launch html file 32. The launch html file 32 then loads the comm html file 34 into a content window at 68, which may be displayed as a new window for the user, as indicated at 70. The comm html file 34 may perform various system checks at 72, such as checking for an acceptable version of the Flash Player associated with the browser. As illustrated in the right column 64 of FIG. 3, if the user does not have an acceptable Flash version (or other necessary software) associated with the browser, the user may be prompted to install Flash at 74. Alternatively, if the user's computer meets the minimum requirements, the content window may display a message, such as "Loading," as illustrated at 76.

Continuing with FIG. 3, and particularly the left column 62 of the use case 60, the comm html file 34 may additionally load the comm js file 40 into the content window, at 78. As described above, the comm js file 40 may be adapted to run in the background of the content window to open and maintain communication links between the RLO repository 14 and the learning management system 12, as shown at 80. The comm js file 40 may perform any necessary functions to open the communication protocols between the RLO repository 14 and the learning management system 12 before the comm html file 34 loads the comm swf file 36 into the content window, as at 82. While the comm swf file 36 is being loaded into the content window, the message and/or indicator in the user's screen may be updated to reflect that the course is being loaded, as indicated at 84 in the right column 64 of the use case 60 of FIG. 3.

The comm swf file 36 may perform at least two functions in any order and may alternate between the functions as necessary. For example, the comm swf file 36 may call javascript code or other code, such as may be incorporated in the comm js file 40, to retrieve information from the learning management system 12 using SCORM, as indicated at 86. Additionally and as illustrated at 88, the comm swf file 36 may load a RLO 42 from the RLO repository 14 into the content window. In one exemplary implementation of the comm swf file 36, the comm swf file may load a content delivery engine 38 and provide the location of the RLO files 42 to the content delivery engine. Considering the user experience shown in the right column 64, the RLO and/or content delivery engine may cause the content of the RLO to be displayed in the content window for use by and interaction with the user, as indicated at 90.

While the user interacts with the content window and the content delivery engine and RLO displayed therein, the content delivery engine 38 may be collecting data regarding the learning session and the user's performance. For example, the content delivery engine may collect simple data such as time in a particular RLO, answers to questions posed by the RLO's, or score in a series of questions or quizzes presented by the RLO's. Additionally or alternatively, the content delivery engine 38 may be adapted to collect data on the user's session that is more complicated, such as the order of steps in a simulation exercise. The data collected by the content delivery engine 38 may be stored in a data layer of the content delivery engine, such as in a flash file or other temporary data file, while the content delivery engine is running in the content window. The content delivery engine 38 may be adapted to periodically send some or all of the collected data to the learning management system via SCORM conformant communication protocols, such as may be triggered by periodic timers during the runtime of the content delivery engine, by user selecting commands such as "save" or "check," or by the user closing the content window.

When the content delivery engine 38 determines to send some or all of the collected data to the learning management system 12, the RLO repository 14, and particularly the content delivery engine 38 may call one or more functions in the comm swf file to begin the transfer of data back to the learning management system, as indicated at 92 in FIG. 3. The comm swf file 36 may then, as indicated at 94, cooperate with the comm js file 40 to transmit data to the learning management system via SCORM conformant communication protocols, which may include use of Flash and/or javascript files. Once the data is communicated to the learning management system 12, the student data is stored in the databases 24 of the learning management system for reporting, as indicated at 96.

As suggested above, the content delivery engines 38 of the present disclosure may be adapted to collect data regarding the user's learning session and report the data back to the learning management system. In some implementations, such as where the learning system 10 and the content delivery engines 38 are adapted to run simulations for the users to practice, the content delivery engines 38 may be adapted to collect substantially more types and greater quantity of data than conventional learning management systems collected, which was primarily time, position or location, and scores on tests. In order to accommodate the increased volume and diversity of data collected by the content delivery engines 38, the learning management systems 12 of the present disclosure may be adapted to have enhanced learning management engines 22 and more robust learning management databases 24. Additionally or alternatively, even when the content delivery engines are delivering relatively uncomplicated RLO's, the learning management systems of the present disclosure may provide a broader range of reporting options than traditionally available. For example, learning management systems 12 of the present disclosure may receive data from the content delivery engines regarding the progress of a given student and may convert that data into a progress bar indicator that grows as the user progresses through the content of the RLO or as the user accomplishes certain tasks or achieves certain levels of performance within the content of the RLO. Additionally or alternatively, the learning management systems may provide progress reports for individual students and/or groups of students. Such progress reports may be presented in conventional columnar data views. Additionally, the learning management systems may be adapted to take the data provided by the content delivery engine and provide dynamic delivery of visual, dashboard-style data views, such as bar charts, line graphs, pie charts, or other more graphical views of the students' progress. In simulation environments, the reporting options available in the present learning management systems are limited only by the types of data that are collected by the content delivery engine, which may vary with the types of simulations being performed.

Figure 4:
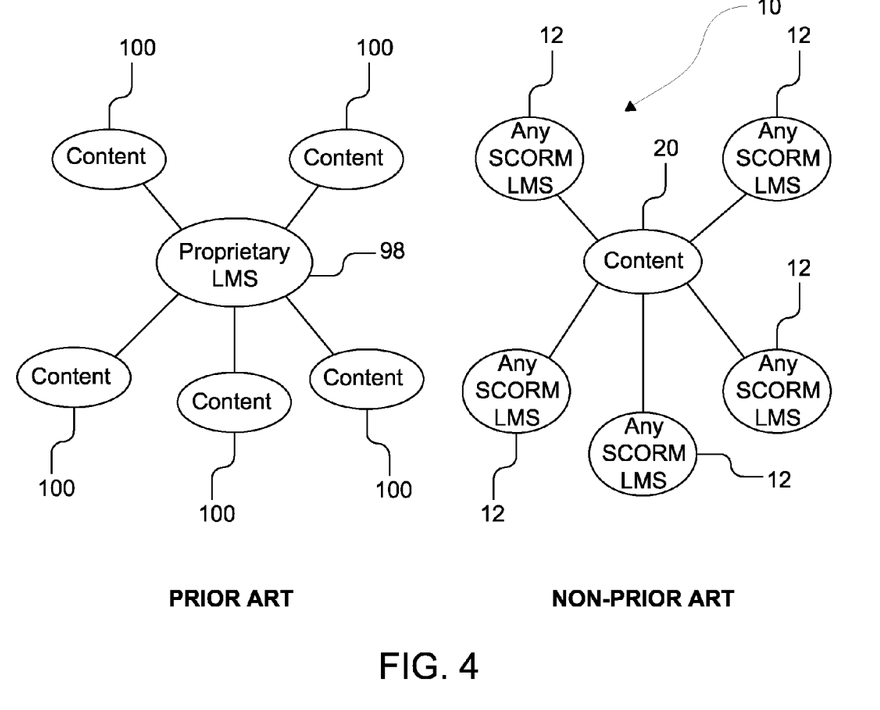
FIG. 4 is a high level schematic representation contrasting prior art learning systems from the system of the present disclosure.

FIG. 4 illustrates a schematic representation of a prior art learning system on the left of the figure contrasted against a non-prior art learning system 10 of the present disclosure shown on the right of the figure. As shown, some prior art systems have been described as providing a unique and proprietary learning management system 98 capable of incorporating content 100 from a variety of sources and/or locations. By contrast, the present disclosure describes a learning system 10, for example as shown in FIG. 1 and the right side of FIG. 4, that provides centralized content 20 capable of being incorporated with a variety of SCORM-compliant learning management systems 12. The centralized content 20 may be mixed with any learning management system 12 capable of becoming compatible with the system of the present disclosure, whether or not such learning management system 12 is SCORM-compliant.

Figure 5:
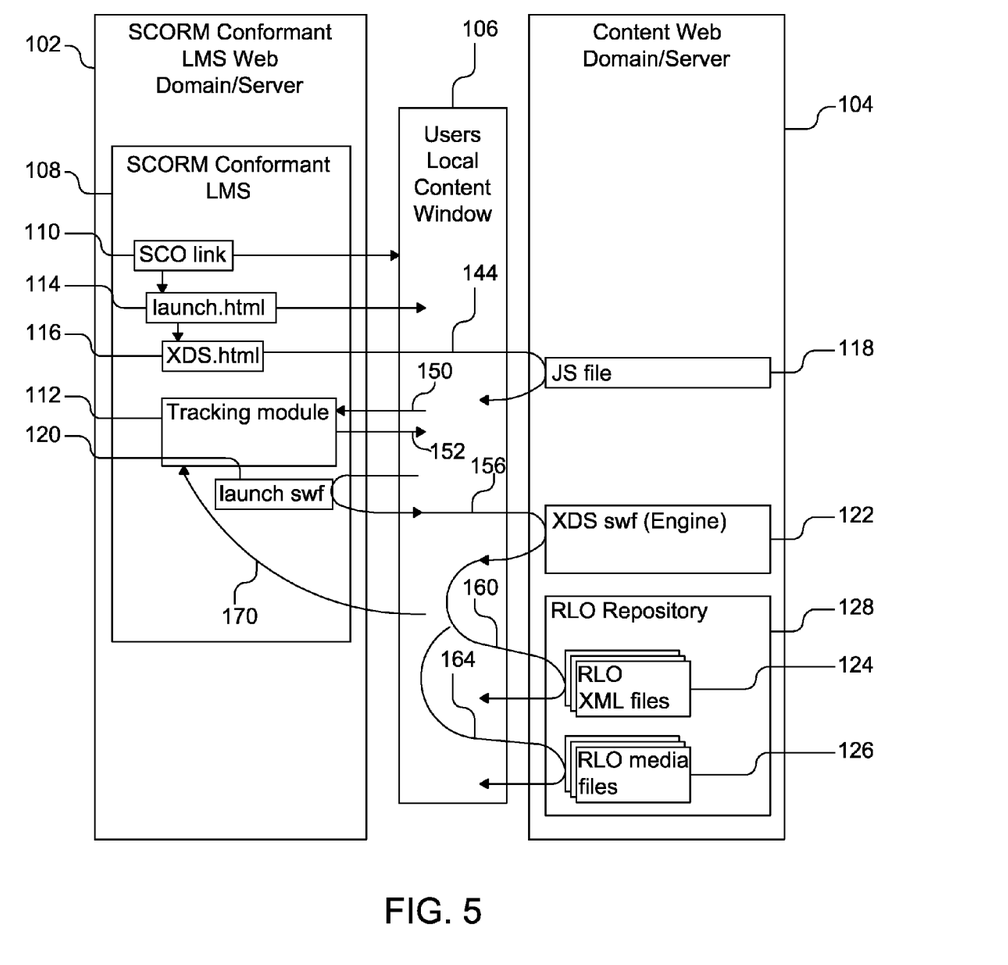
FIG. 5 is a schematic representation of a learning system within the scope of the present disclosure.

FIG. 5 illustrates a schematic diagram of an example of a learning system 10. The learning system 10 may include functional software components at a learning management system 12 location 102, a content location 104, and one or more user local content windows 106. The location 102 may include a learning management system (LMS) Web domain, a server, and/or may exist behind a firewall. The location 104 may include a content Web domain, a server, and/or exist behind a firewall. Any portion of the location 102 may be separate from any portion of the location 104. The location 102 may include a SCORM conformant LMS 108, which LMS 108 may also include one or more SCO links or pointer SCOs 110 and a tracking module 112. The tracking module 112 may be capable of receiving, storing, and sending SCORM conformant user performance data to and from the content window 106. Such SCORM conformant user performance data may, for example, include one or more bookmarks of where a user last viewed educational materials, a user's session information, history, performance, progress, efficiency, effectiveness, personal data, course data, academic data, time spent, standard reached, completion data, most recently viewed content, and completion percentage.

The content window 106 may be capable of launching and/or loading a number of files received from and or sent to the location 102 and/or location 104. Such files may, for example, include one or more of the following files: a launch.html file 114, an XDS.html file 116, a communication file 118 (such as a JS file), a launch swf file 120, and XDS swf file and/or navigation engine 122, an XML file 124, and/or an RLO media file 126. The location 102 may include various files and software components capable of interfacing with the content window 106, such as the SCO link 110, launch.html file 114, XDS.html file 116, the launch swf file 120, and/or the tracking module 112. The content location 104 may include various files and software components capable of interfacing with the content window 106, such as the communication file 118, the XDS swf file and/or engine 122, and an RLO repository 128 containing content, such as one or more of the XML files 124 and/or one or more of the RLO media files 126.

Figure 6:
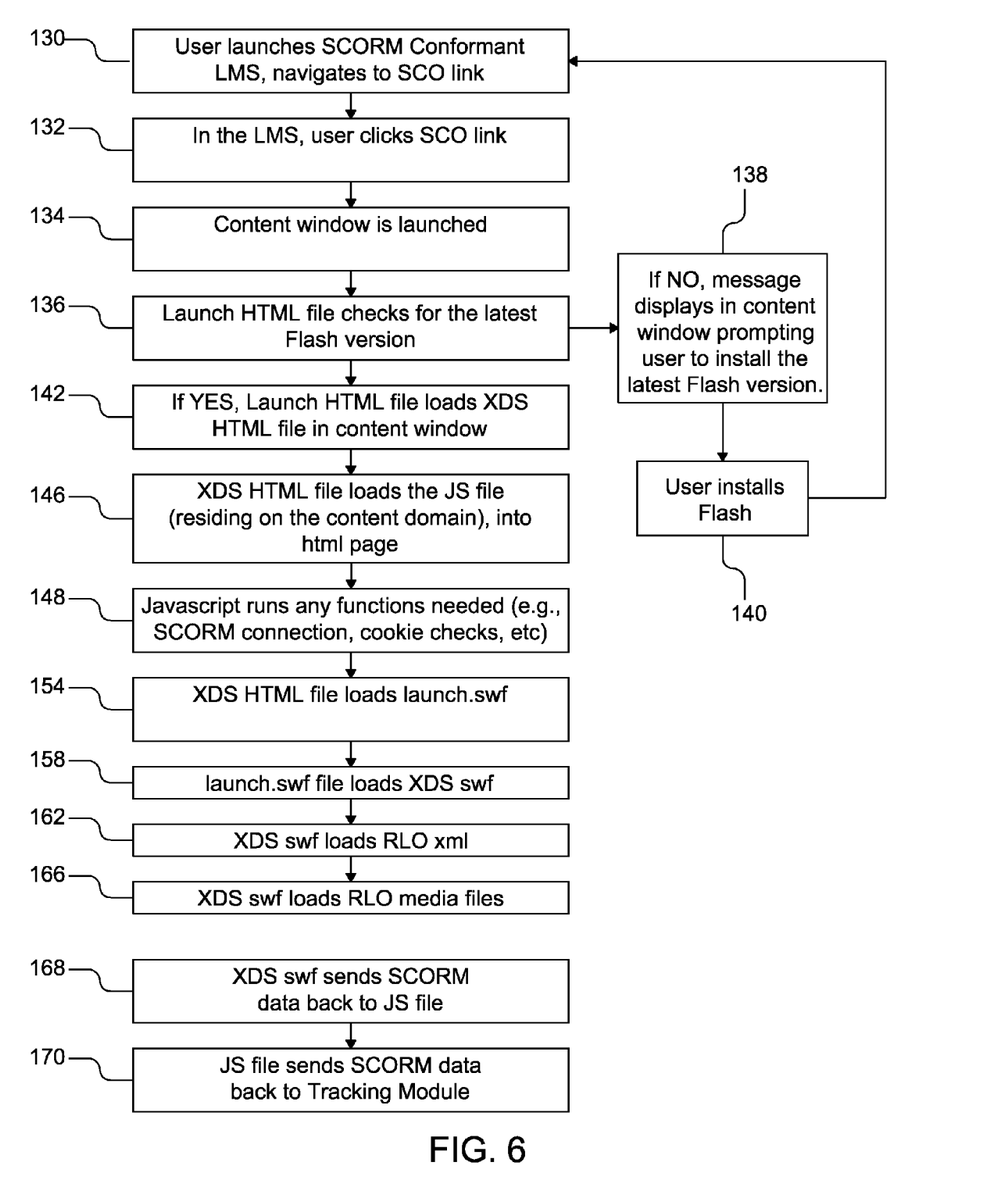
FIG. 6 is a flow chart illustrating an example of a method relating to the learning system of FIG. 5.

Referring collectively to FIGS. 5 and 6, a user may access the learning system 10 by launching 130 the SCORM conformant LMS 108 and navigating to the SCO link 110. While in the LMS 108, the user may then click 132 on the SCO link 110. The SCO link 110 will then, when clicked, launch 134 the content window 106 and the launch.html file 114. The launch.html file 114 checks 136 to ensure that the user has installed the latest Flash version on the user's local computer. If the latest Flash version, or other software necessary for the content window 106 to function properly, is not installed, a message displays 138, for example, in the content window 106 prompting the user to install the latest Flash version. A user may then install 140 the latest Flash version, at which point the user will likely need to restart the process by launching 130 the SCORM conformant LMS 108.

If, on the other hand, a user has already installed the latest Flash version, then the launch.html file 114 loads 142 the XDS.html file 116 into the content window 106. The XDS.html file 116 then sends 144 a request to the content location 104 to load 146 the communication file 118 from the content location 104 into an html page of the content window 106. The communication file 118 runs 148 any functions needed, for example, by sending 150 and receiving 152 data to and from the tracking module 112, such as SCORM connection data, cookie checks, user performance data, or other data. The XDS.html file 116, in conjunction with the communication file 118, prompt the launch.swf file 120 to load 154 into the content window 106. The launch.swf file 120 sends 156 a request to the content location 104 to load 158 the XDS swf file or engine 122 in the content window 106. The XDS swf file or engine 122 in turn sends 160 a request to the content location 104 to load 162 one or more XML files 124 into the content window 106, and the XDS swf file or engine 122 also sends 164 a request to the content location 104 to load 166 one or more RLO media files 126 into the content window 106. The XDS swf file or engine 122 is configured to send 168 SCORM data back to the communication file 118. The communication file 118, in turn, can pass on or send 170 the SCORM data back to the tracking module 110.

Accordingly, the learning systems of the present disclosure provide educators and learners with improved learning experiences. More specifically, the present learning systems may provide improved reporting for the educators and greater customizability of the educational materials. Additionally, the learners may experience improved performance tracking and reporting to enable the learners to improve more quickly. Moreover, administrators of learning systems may find significant efficiencies in having the educational content and RLO's stored in a centralized RLO repository such that the administrators do not experience interruption when the content developers want to update the educational materials. Still additionally, the content developers may find greater ease when attempting to update content that is used by multiple learning management systems and may find greater comfort and security in knowing that the content is hosted on a single central repository rather than across multiple Web domains.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. The principles of the present disclosure may be embodied in other specific forms without departing from its structures, methods, or other essential characteristics as broadly described herein. The described embodiments are to be considered in all respects only as illustrative, and not restrictive. The scope of the disclosure is, therefore, not limited by the foregoing description and all changes that come within the meaning and range of equivalency of the foregoing description are to be embraced within its scope. Similarly, where the description recites "a" or "a first" element or the equivalent thereof, such description should be understood to include incorporation of one or more such elements, neither requiring nor excluding two or more such elements.

Applicant reserves the right to submit claims directed to certain combinations and subcombinations that are directed to one of the disclosed inventions and are believed to be novel and non-obvious. Inventions embodied in other combinations and subcombinations of features, functions, elements and/or properties may be claimed through amendment of those claims or presentation of new claims in that or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A method, comprising:

receiving, at a first server within a first Web domain, a first request for educational content that resides within the first Web domain, wherein the first request for the educational content is received from a first learning management system (LMS) residing within a second Web domain distinct from the first Web domain;

receiving, at the first server, a second request for the educational content that resides within the first Web domain, wherein the second request for the educational content is received from a second LMS residing within a third Web domain distinct from the first Web domain and the second Web domain;

displaying the educational content in a Shareable Content Object Reference Model (SCORM) conformant navigation engine within the first Web domain via a first pointer Shareable Content Object (SCO) in the first LMS within the second Web domain;

displaying the educational content in the SCORM-conformant navigation engine within the first Web domain via a second pointer SCO in the second LMS within the third Web domain;

modifying the educational content within the first Web domain, and making the modified educational content available for access via the first LMS within the second Web domain or via the second LMS within the third Web domain, without distributing the modified educational content to a second server on which the first LMS resides, or to a third server on which the second LMS resides;

displaying existing learner performance data in the SCORM-conformant navigation engine residing within the first Web domain, wherein the existing learner performance data is received from the first LMS via the first pointer SCO or from the second LMS via the second pointer SCO, and wherein the existing learner performance data comprises at least one of a user's session information, bookmark, history, performance, progress, efficiency, effectiveness, personal data, course data, academic data, time spent, standard reached, completion data, most recently viewed content and completion percentage;

sending, from the SCORM-conformant navigation engine within the first Web domain, via the first pointer SCO, first updated learner performance data to the first LMS; and sending, from the SCORM-conformant navigation engine within the first Web domain, via the second pointer SCO, second updated learner performance data to the second LMS.

2. A learning system, comprising:

educational content configured to reside within a first Web domain;

a Shareable Content Object Reference Model (SCORM)-conformant navigation engine residing within the first Web domain, wherein the SCORM-conformant navigation engine is configured to communicate with a first SCORM-conformant learning management system (LMS) residing within a second Web domain distinct from the first Web domain, and wherein the educational content does not reside in the first SCORM-conformant LMS or within the second Web domain, wherein the SCORM-conformant navigation engine is configured to communicate with a second SCORM-conformant LMS residing within a third Web domain distinct from the first Web domain and the second Web domain, and wherein the educational content does not reside in the second SCORM-conformant LMS or within the third Web domain; and a first server within the first Web domain, wherein the first server is configured to receive a first request for the educational content that resides within the first Web domain, wherein the first request for the educational content is received from first SCORM-conformant LMS residing within the second Web domain, wherein the first server is further configured to receive a second request for the educational content that resides within the first Web domain, wherein the second request for the educational content is received from the second SCORM-conformant LMS residing within the third Web domain distinct from the first Web domain and the second Web domain;

wherein the educational content is configured to be displayed in the SCORM-conformant navigation engine within the first Web domain via a first pointer Shareable Content Object (SCO) in the first SCORM-conformant LMS within the second Web domain;

wherein the educational content is configured to be displayed in the SCORM-conformant navigation engine within the first Web domain via a second pointer SCO in the second SCORM-conformant LMS within the third Web domain;

wherein the educational content within the first Web domain is configured to be made available for access via the first SCORM-conformant LMS within the second Web domain or via the second SCORM-conformant LMS within the third Web domain, without distributing the educational content to a second server on which the first SCORM-conformant LMS resides, or to a third server on which the second SCORM-conformant LMS resides;

wherein existing learner performance data is configured to be displayed in the SCORM-conformant navigation engine residing within the first Web domain, wherein the existing learner performance data is received from the first SCORM-conformant LMS via the first pointer SCO or from the second SCORM-conformant LMS via the second pointer SCO, and wherein the existing learner performance data comprises at least one of a user's session information, bookmark, history, performance, progress, efficiency, effectiveness, personal data, course data, academic data, time spent, standard reached, completion data, most recently viewed content, and completion percentage;

wherein first updated learner performance data is configured to be sent from the SCORM-conformant navigation engine within the first Web domain, via the first pointer SCO, to the first SCORM-conformant LMS; and wherein second updated learner performance data is configured to be sent from the SCORM-conformant navigation engine within the first Web domain, via the second pointer SCO, to the second SCORM-conformant LMS.

3. The learning system of claim 2, wherein the first SCORM-conformant LMS within the second Web domain and the second SCORM-conformant LMS within the third Web domain comprise separate and distinct enterprise learning environments.

4. The learning system of claim 2, wherein the first SCORM-conformant LMS and the SCORM-conformant navigation engine populate a content window configured to be viewed by a user.

5. The learning system of claim 2, wherein the SCORM-conformant navigation engine comprises an swf engine.

6. The learning system of claim 2, wherein a reusable learning object (RLO) repository resides within the first Web domain.

7. The learning system of claim 6, wherein the RLO repository comprises the educational content.

8. The learning system of claim 7, wherein the educational content includes an XML file and a media file.

9. The learning system of claim 2, wherein the first SCORM-conformant LMS further comprises a first tracking module, wherein the second SCORM-conformant LMS further comprises a second tracking module, wherein the first tracking module is configured to communicate the first updated learner performance data, and wherein the second tracking module is configured to communicate the second updated learner performance data.

* * * * *